(No Model.) 3 Sheets—Sheet 1.
G. B. HAZLEHURST & F. J. COLE.
COUPLING GAGE.
No. 491,174. Patented Feb. 7, 1893.
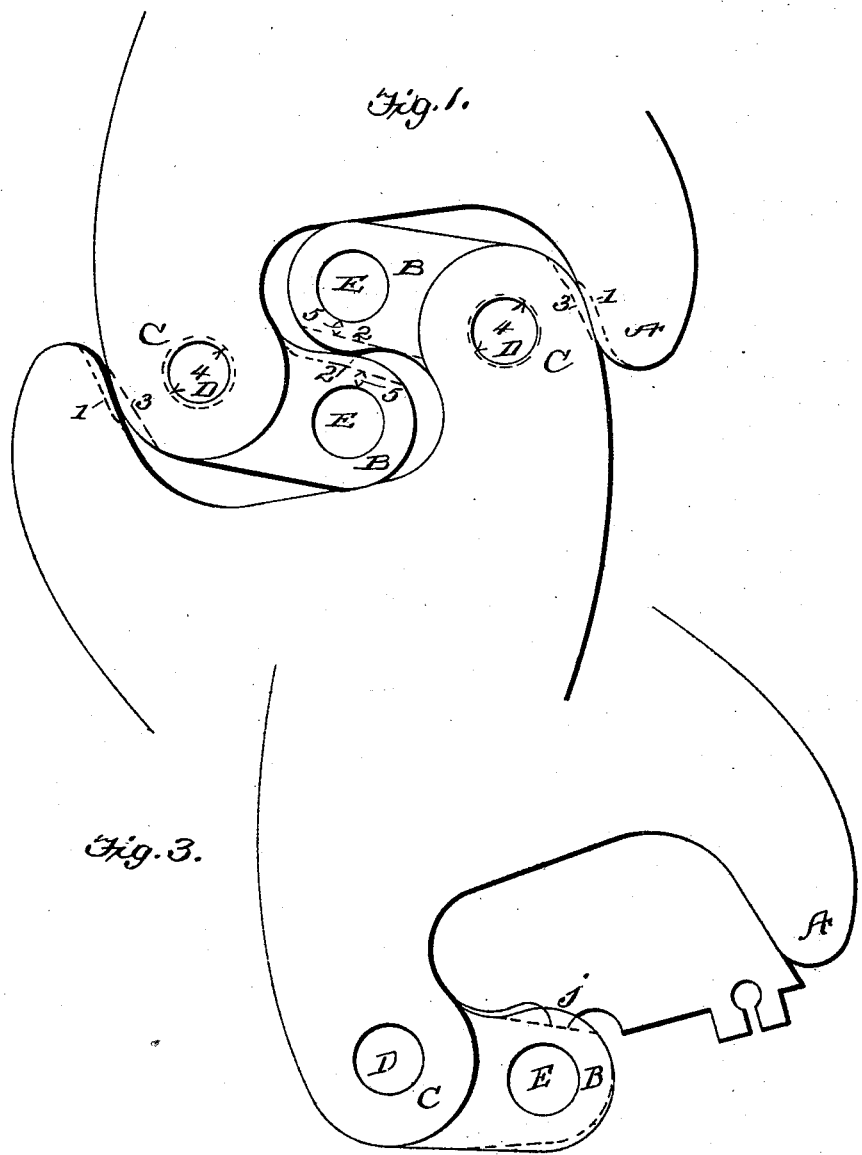

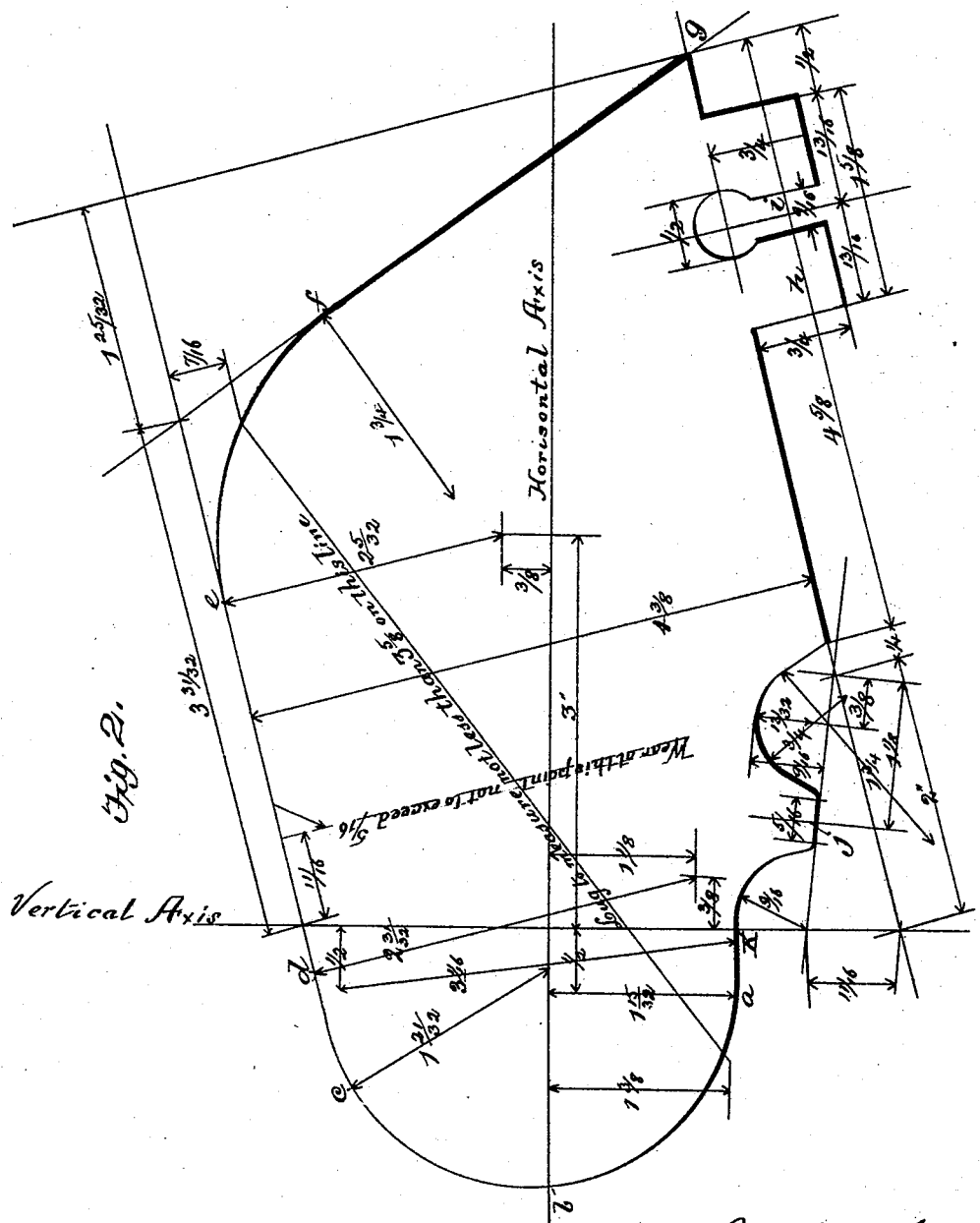

(No Model.) 3 Sheets—Sheet 3.
G. B. HAZLEHURST & F. J. COLE.
COUPLING GAGE.
No. 491,174. Patented Feb. 7, 1893.
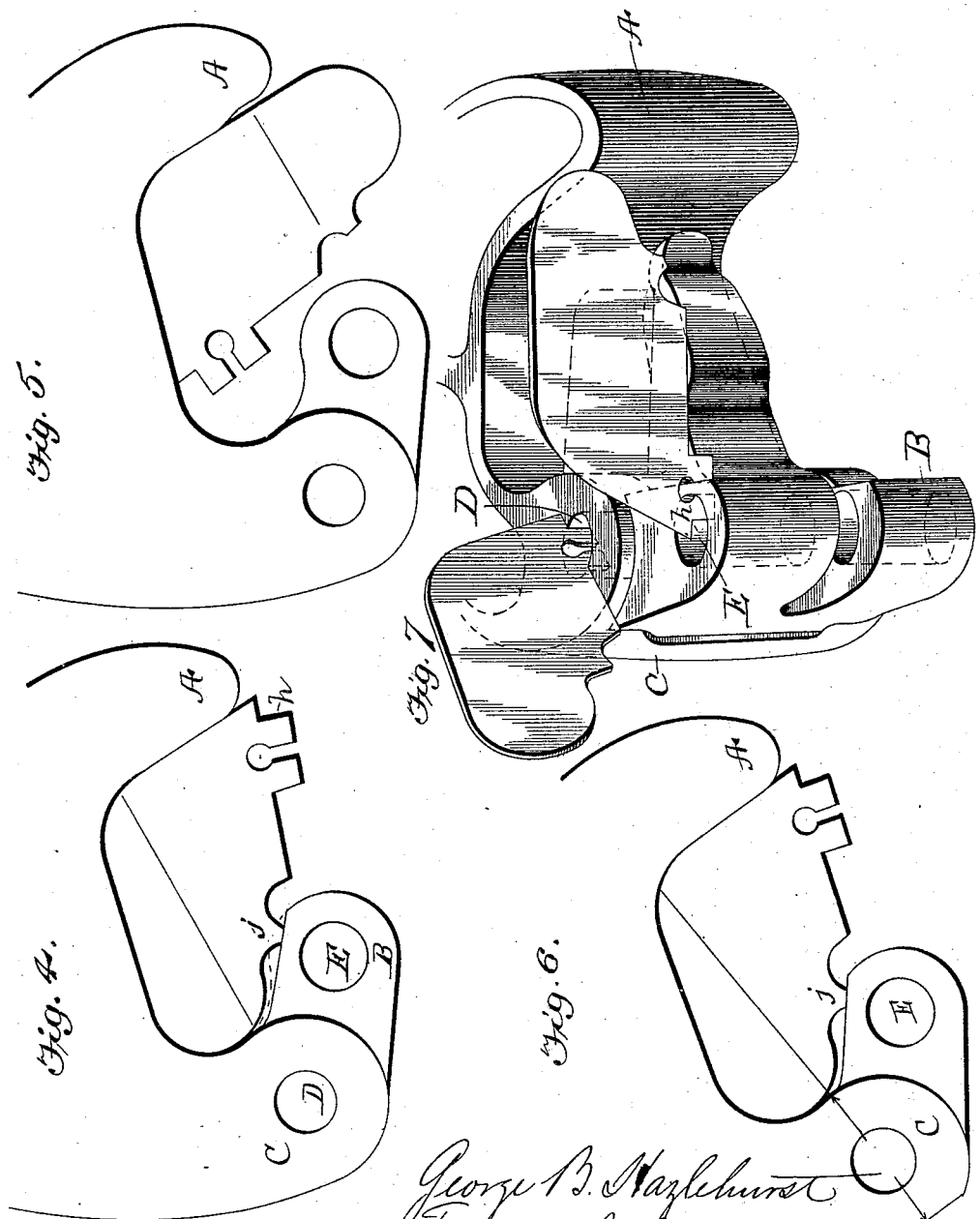

UNITED STATES PATENT OFFICE.

GEORGE BLAGDEN HAZLEHURST AND FRANCIS JOHN COLE, OF BALTIMORE, MARYLAND.

COUPLING-GAGE.

SPECIFICATION forming part of Letters Patent No. 491,174, dated February 7, 1893.

Application filed October 14, 1892. Serial No. 448,917. (No model.)

*To all whom it may concern:*

Be it known that we, GEORGE BLAGDEN HAZLEHURST and FRANCIS JOHN COLE, citizens of the United States, and residents of the city of Baltimore, in the State of Maryland, have invented certain new and useful Improvements in Coupling-Gages, of which the following is a specification.

Our invention relates to a gage used for testing the wear of a form of car coupler known as the Janney coupler. The same general form of coupler is made by others and is designated as the Standard Master Car Builders Association's Coupler. All couplers of this form consisting of automatic hook-couplers have the same contour on their interior and we have invented a gage conforming in shape to the interior contour of the coupler for the purpose of testing its wear to determine when the couplers are worn beyond a limit of safety, at which point it is necessary to renew them either entirely or in part.

The principle of our invention consists in testing the wear of the coupler from the interior and our principle may be applied to any other form of coupler which differs in contour lines from the Janney coupler but yet employs the same principle.

The jaws, lugs, pin &c., of the coupler from continual use become so worn that they depart from the standard of the contour lines until, if such wear is allowed to continue, the shape of the hook forming the contour of the coupler is changed or distorted to such an extent that the coupler will pull apart and allow the train to separate. With the increased use of these couplers the necessity is becoming apparent for some quick and reliable method of gaging the amount of wear which it is safe to permit and the time when the renewal of various parts should take place. We have devised such a method in the gage plate which we have invented.

In the drawings, Figure 1 represents a horizontal plan view of a coupler when new and unworn. It also shows in dotted lines the places where wear is liable to occur by the contact of the surfaces. Fig. 2 is a plan view of our gage plate giving its dimensions and certain directions for use. Fig. 3 shows a horizontal plan view of the coupler with the gage plate inserted within the coupler and showing a portion of the plate lying over the edge of the interior of the knuckle, and in dotted lines the extent to which the wear may occur. Fig. 4 shows the same, the interior of the knuckle being worn sufficiently to permit the gage plate to pass through the coupler. Fig. 5 is a horizontal plan view of the coupler with the plate in position for testing the wear of the guard arm. Fig. 6 is a plan view of the coupler with the gage plate in place, showing the coincidences of the line inscribed across the plate with the measurement across the knuckle C of the coupler. Fig. 7 is a perspective view of the coupler with the plate applied to a worn coupler in two positions. In one it is testing the width of the wall between the interior surface of the knuckle and the hole in its end; and in the second position it is testing the size of the knuckle pin hole.

By reference to Fig. 1 it will be seen that the points where the coupling will wear are designated by numbers, and that the tests to be made to determine that wear can be indicated in the same way. They are five in number. The first, that marked 1 in Fig. 1, is the contact surface of the interior of the guard arm A of the coupler. 2 is the contact surface of the interior side of the knuckle B. 3 is the contact surface of the exterior of the knuckle joint C. 4 is the hole in the knuckle joint which forms the bearing for the pin D. 5 is the width of the wall between the bearing surface on the interior of the knuckle B and the hole E in the extremity of said knuckle. These are the five points to be tested to determine the wear of the coupling.

The gage plate as shown in Fig. 2 consists of a plate of flat metal generally of steel about three thirty-seconds of an inch thick conforming on three sides to the contour of the interior of the coupling.

The contour of the gage may be described as follows: A straight line is taken as the horizontal axis of the gage. From a point on this line describe a quadrant with a radius of one and fifteen thirty-seconds inches from the line downward; the lower extremity of the arc is marked $a$ and the upper one $b$. Then from the point $b$ describe an arc above the line with a radius of one and twenty-one thirty-seconds inches, of about seventy degrees, to a point marked $c$. Then at a point on the horizontal axis one and thirty-one thirty-seconds inches from the point $b$ to the right, erect a perpendicular crossing the line above and below it; then from a point which is at the intersection of two arcs, one three-eighths inch, the center of which is on the vertical axis and one and one-eighth inches below the intersection of the vertical and horizontal axes, and the other from a center on the horizontal axis and three-eighths inch to the right of the vertical axis with a radius of one and one-eighth inches. With the point of intersection of the two preceding arcs as a center describe an arc from the point $c$ with a radius of two and thirty-one thirty-seconds inches of about twenty degrees to the point $d$; thence from said point $d$ in a straight line a distance of two and seven-eighths inches to the point $e$; thence from the point $e$ describe an arc with a radius of two and five thirty-seconds inches to the point $f$ the center of which point will be three-eighths of an inch above the horizontal axis, and a distance of three inches from the vertical axis. This arc is about sixty degrees. Thence from the point $f$ by a straight line three and three-eighths inches long to a point $g$ which is six and seven-eighths inches from the vertical axis, which latter distance is upon a line parallel to the line $d$—$e$, and four and three-eighths inches therefrom. Upon the fourth side of the gage near the point $g$, is a projecting lug $h$, one and five-eighths inches wide, which is slit in the center with a slot $i$, nine thirty-seconds inch wide. On the other end of the fourth side is a projecting lug $j$ located as follows: From the point $a$ an arc is drawn to the vertical axis with a radius of three and one-sixteenth inches, the center of which is in a vertical line passing through the point $a$, which line is one-half inch to the left of the vertical axis. From that point, $k$, an arc is drawn downward, of a radius of nine-sixteenths inch, the center of which is upon the vertical axis, for about ninety-five degrees. From the center of the last circle, a point is located eleven-sixteenths inch below said center on the vertical axis and a straight line is drawn from that point coincident with the front edge of the plate, two inches long. From this point the third side of the triangle is located to the center of the last described arc. This line forms the extremity of the lug on the left side of the plate which bears upon the interior of the knuckle hook and terminates the permissible extent of its wear. The end of this lug is five-sixteenths inch wide and on its right side an arc is described from its right-hand extremity into the plate nearly a semi-circular notch with a radius of about three-fourths inch.

Referring now to Fig. 3 it will be seen that the lug $j$ on the gage plate rests upon the interior edge of the knuckle B, and if the wear is not sufficient to permit the plate to pass down through the interior of the coupling the knuckle does not need renewal. If however, the wear is to the extent shown in Fig. 4 the plate will pass through the coupling and it will indicate that the interior of the knuckle B is so much worn as to require it to be renewed.

Fig. 5 shows the application of the gage to test the wear of the guard A. The gage is taken from the position shown in Fig. 4 and reversed and placed within the knuckle formed by the guard arm A in the body of the coupling. On the reverse side of the gage plate is an inscribed line at a point eleven-sixteenths inch from the vertical axis of the plate and perpendicular to the straight edge of the plate at that point. If it is found by measurement that the wear of the guard arm A exceeds an amount previously determined for the particular class of coupler being tested, that portion of the coupler requires renewal.

Referring to Fig. 6, test No. 3 is there shown. Across the face of the plate a line is inscribed, drawn from a point upon the first arc $a$—$b$, formed by the intersection with said arc of a vertical line one and three-eighths inches long dropped from the horizontal axis of the plate, and a point in the arc $e$—$f$ which is formed by a straight line dropped at right angles to an extension of said straight side and seven-sixteenths inch long.

When the gage is placed within the coupling in the position shown in Fig. 6 and a rule is applied to this line, the width of the knuckle joint should not be less than a predetermined measurement for the class of coupler being tested. If it is, it indicates an excessive wear which requires renewal.

Referring to Fig. 7 the test No. 4 is made by inserting the lug $h$ which is on the front side of the gage and which is larger than the knuckle pin hole and determines its permissible wear, within the hole in the knuckle joint. If it will enter, it indicates an excessive wear of that hole which will condemn the coupling. This figure also shows the test of point 5 which is the width or thickness of the wall between the interior surface of the knuckle B and the hole E through the center of the knuckle. This thickness must always be greater than the width of the slot, if less, it indicates an excessive wear of the knuckle.

Having thus described our invention, what we claim and desire to secure by Letters Patent, is:

1. A gage plate for testing the wear of an automatic hook coupler which consists of a plate of metal the exterior of which on three sides conforms in shape either wholly or in part to the standard interior contour of the coupler, with a projection upon its front edge projecting beyond the standard contour line of the interior of the knuckle of an extent sufficient to prevent said plate from passing through the coupling until the wear of said knuckle reaches a predetermined limit, substantially as described.

2. A gage plate for testing the wear of an automatic hook-coupler which consists of a plate of metal the exterior of which on three sides conforms in shape either wholly or in part to the standard interior contour of the coupler, with a line inscribed across said plate so as to pass through the center of the knuckle pin for the purpose of locating the point at which the diameter of said knuckle joint shall be measured, as and for the purpose specified.

3. A gage plate for testing the wear of an automatic hook-coupler which consists of a plate of metal the exterior of which on three sides conforms in shape either wholly or in part to the standard interior contour of the coupler, with a line inscribed across the said plate about mid-way of its straight edge for the purpose of determining the point at which the wear of the guard arm A is to be measured, as and for the purpose specified.

4. A gage plate for testing the wear of an automatic hook-coupler which consists of a plate of metal the exterior of which on three sides conforms in shape either wholly or in part to the standard interior contour of the coupler, and provided on the fourth side with a square lug of a size greater than the normal diameter of the pin hole in the knuckle joint, as and for the purpose specified.

5. A gage plate for testing the wear of an automatic hook-coupler which consists of a plate of metal the exterior of which on three sides conforms in shape either wholly or in part to the standard interior contour of the coupler, with a slot cut into its edge upon the fourth side of a predetermined width which will be less than the normal thickness of the wall between the interior surface of the knuckle and the interior of the pin hole in the extremity of the knuckle, as and for the purpose specified.

Signed at Baltimore city, in the State of Maryland, this 7th day of October, A. D. 1892.

GEORGE BLAGDEN HAZLEHURST.
FRANCIS JOHN COLE.

Witnesses:
J. B. MASON,
G. V. SPEDDEN.